March 29, 1955 L. E. SCHROEDER 2,705,046
FUEL FLOW REGULATOR
Filed Oct. 6, 1950
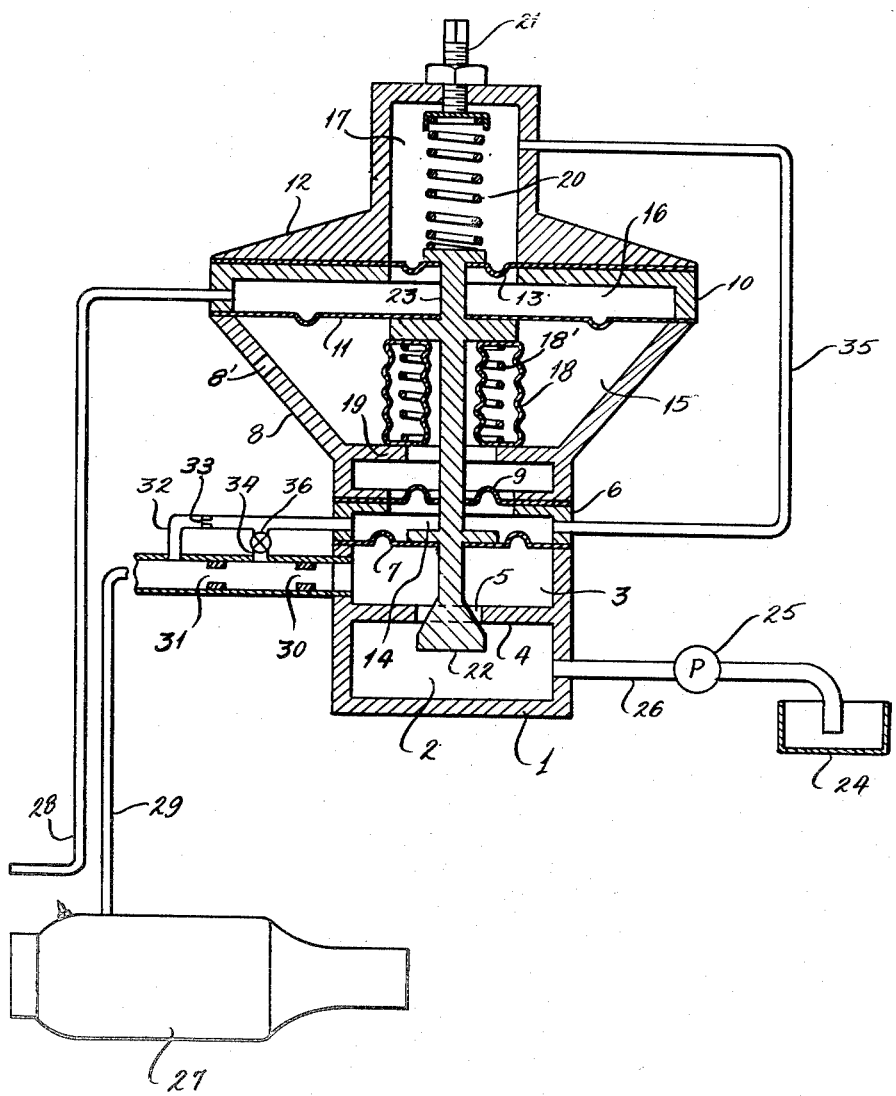
INVENTOR.
LLOYD E. SCHROEDER
ATTORNEYS.

United States Patent Office 2,705,046
Patented Mar. 29, 1955

2,705,046

FUEL FLOW REGULATOR

Lloyd E. Schroeder, Glen Carbon, Ill., assignor to McDonnell Aircraft Corporation, St. Louis, Mo., a corporation of Maryland Application October 6, 1950, Serial No. 188,778

6 Claims. (Cl. 158—36)

The primary object of the invention is to provide a fuel flow regulator that is not sensitive to variations in fuel inlet pressure.

Another object of the invention is to provide a fuel flow regulator that will raise or lower delivered fuel pressure for maintaining a predetermined flow regardless of the varying downstream restrictions in the fuel passageway leading from the fuel chamber in the regulator.

A further object of the invention is to provide mechanism in a fuel flow regulator for preventing deviation in fuel flow from a pre-selected schedule when used with engines having different injector characteristics, varying combustion chamber pressure, or progressive obstructions in the injector nozzle.

The invention consists in the provision of a valve for delivering pressurized fuel in which the valve is controlled by equilibrating forces imposed thereon by fuel pressure, ram pressure, static pressure, an evacuated bellows and a spring for delivering a constant flow of fuel for a given set of conditions of ram and static pressure, the latter being achieved by creating a force determined by the pressure drop across an orifice in the fuel discharge line, imposing it on the valve and also the spring for further regulating the operation of the valve.

The single figure of the drawing illustrates the invention in which the numeral 1 designates the part of the housing in which fuel inlet chamber 2 and metered fuel chamber 3 are formed by means of a dividing wall 4 provided with an aperture 5. A housing part 6 is disposed above the part 1 and a diaphragm 7 interposed therebetween. Another housing part 8 is positioned above the part 6 and a diaphragm 9 disposed therebetween. A housing part 10 is disposed above the part 8 and a diaphragm 11 interposed between these parts. A housing part 12 is disposed above part 10 and a diaphragm 13 interposed therebetween. The various housing parts and diaphragms form chambers in the control device in which 14 is the discharge pressure chamber, 15 the static pressure chamber which is vented to atmosphere at port 8', 16 the ram pressure chamber, and 17 the spring and balance pressure chamber. An evacuated corrugated bellows 18 having an internal spring 18' is located in the housing part 8 between the diaphragm 11 and a shoulder 19 formed therein. A spring 20 is located in chamber 17 and may be adjusted by means of a screw 21 threaded into housing part 12. In a system of diaphragms of the described character, the diaphragms 9 and 13 form a balanced seal system and do not enter into the equilibrium equation, as will appear from the fact that a conduit 35 openly connects the outer sides of these diaphragms for equalizing pressure effects thereon.

A fuel supply control valve 22 provided with a stem 23 is positioned within the assembled housing and seats on the dividing wall 4, the aperture in the wall being suitably machined so that it constitutes a seat for the valve. The valve stem 23 is secured to each of the diaphragms assembled in the housing, and the spring 20 tends to move the valve to its open position. This action of spring 20 is aided by ram pressure acting on diaphragm 11. The above action of valve 22 to be moved to its open position is opposed by fuel pressure in chamber 3 acting on diaphragm 7 and is also opposed by reduction in the static pressure acting on bellows 18 in chamber 15. The bellows 18 has one end abutting the fixed shoulder 19 and its opposite end abutting a part of the valve stem 23 engaged with diaphragm 11. The bellows 18 is subject at all times to the ambient pressure which varies the effect of spring 18' on the diaphragm 11 in opposition to ram pressure in chamber 16. The supply of fuel for control by valve 22 is derived from a sump or tank 24 from which it is withdrawn by pump 25 inserted in conduit 26 and delivered to inlet chamber 2.

The fuel is delivered to a jet engine 27 and adjacent to the engine is a Pitot tube 28 which delivers ram pressure resulting from forward velocity to chamber 16. Fuel is delivered to the engine from chamber 3 through a conduit 29. Fuel flow through the conduit must be constant for a given set of conditions of ram and static pressure regardless of the fuel pressure in chamber 3, which is accomplished by providing a restriction in the conduit comprising an orifice 30 whose diameter is appreciably less than that of conduit 29. A second orifice 31 is provided in conduit 29. A conduit 32 is connected between conduit 29 and chamber 14, and this conduit 32 is provided with an orifice 33. Also a conduit 34 is connected between conduit 29 and conduit 32, the point of connection of conduit 34 to conduit 29 being between the orifices 30 and 31. The spring chamber 17 and chamber 14 are connected by a conduit 35 in order that the pressure conditions in these two chambers may be equal.

The orifice 30 causes the pressure in conduit 29 to be less than that in the fuel chamber 3, which pressure differential is introduced into chamber 14 for action on diaphragm 9. The orifice 33 is sufficiently small so as to make the pressure sensed by conduit 32 ineffective on the pressure in chamber 14 when the solenoid valve 36 is open. By means of the pressure connection 35, the forces produced by diaphragm 9 are cancelled by the action of diaphragm 13, because the same force in opposite directions acts on diaphragms 9 and 13, and these diaphragms are of equal diameter. The pressure differential across the orifice or downstream pressure, which is proportional to the fuel flow, acts on diaphragm 9 which, together with the force generated by bellows 18, particularly the bellows spring 18', tends to close the valve, which action is opposed by the spring 20 and ram pressure in chamber 16 tending to open the valve.

In the chamber 14, the effect of orifice 30 is eliminated by the closing of solenoid valve 36 in the bypass 34. At this point the combined effect of orifices 30 and 31 becomes effective in chamber 14, tending to further restrict the fuel schedule for starting or cruising operation of the associated engine, this valve being subject to control of the pilot or some other method of regulation.

Two stages of fuel flow are made possible by orifices 30 and 31 acting in conjunction with the solenoid control valve 36. Further regulation of the flow control device may be made by adjusting the tension of spring 20 and by masking the diaphragms 11 and 7, thereby altering the effective areas thereof so that further adjustments are possible. During calibration, there are several control variations available, which are either of a fixed or adjustable nature, thus affording considerable flexibility of control. This method of control eliminates the effect of fuel pressure variations as delivered by pump 25, and is independent of the restrictions that might occur in conduit 29 or in the ejector nozzle (not shown), and for a given set of conditions of ram pressure and static pressure, the metered flow will be constant and delivered according to a predetermined schedule.

What I claim is:

1. A fuel flow control device comprising a plurality of housing parts including a first one of said housing parts having a fuel inlet chamber and a metered fuel outlet chamber separated by a common wall, a second housing part adjacent the fuel outlet chamber in said first housing part having a pressure chamber subject to pressure of fuel at the discharge side of said metered fuel outlet chamber, a third housing part adjacent said second housing part providing a static pressure chamber having a vent to atmosphere, a fourth housing part adjacent said third housing part providing a ram pressure chamber, a fifth housing part adjacent said fourth housing part providing a spring chamber, a diaphragm disposed between each of said housing parts acting as a flexible wall for the adjacent housing parts, said common wall between said inlet and outlet chambers having a port therein, a valve controlling said port, said valve bein connected to all of said diaphragms, a spring in the spring chamber of said fifth housing part acting upon said valve in a direction to urge it into port open position, bellows means in said static pressure chamber acting upon said valve in a direction to urge it into port closing position, the bellows means in said static pressure chamber responding to altitude changes of the craft in which the device is mounted, a fuel delivery conduit connected to said fuel outlet chamber having an orifice therein, means connecting said fuel delivery conduit to said second housing part for communicating the fuel pressure on the downstream side of said orifice to said discharge pressure chamber, the adjustment of said valve relative to said port being determined by the resultant of the spring force, fuel pressure acting on the diaphragm forming the wall of said metered fuel outlet chamber, static pressure response by said bellows and ram pressure, and means for establishing communication between said discharge pressure chamber and said spring chamber for cancelling out the adjustment effects upon said valve of the variations in pressure in the delivered fuel.

2. A fuel flow control device comprising a plurality of chambered housing parts arranged in end to end relation, a diaphragm disposed between each of the parts acting as a common wall for the respective chambers, the chamber in one of said parts forming a spring chamber, the chamber in a second adjacent part forming a ram pressure chamber, the chamber in a third part adjacent the second part having a vent therein to atmosphere and forming a static pressure chamber corresponding with the altitude of the craft on which the device is installed, the chamber in a fourth part adjacent the third part forming a discharge pressure chamber, and the chamber in a fifth part adjacent the fourth part forming a fuel chamber, a partition wall in said fifth part dividing the chamber thereof into fuel receiving and metered fuel chambers with said metered fuel chamber having as a wall one of said diaphragms, said wall having a port, a valve for said port controlling flow of fuel from said fuel receiving to said metered fuel chambers, a valve stem connected to each diaphragm for controlling said valve and hence the flow of fuel from said fuel receiving to said metered fuel chamber, the pressure in said meter fuel chamber acting on the adjoining diaphragm tending to close said valve, an evacuated bellows in said static pressure chamber connected to said valve stem, a spring in said spring chamber bearing on said valve stem and tending to open said valve, a conduit connected to said metered fuel chamber having an orifice therein smaller than the bore of said conduit, means for establishing communication between said conduit and said discharge pressure chamber, the connection in said conduit being made on the downstream side of said orifice in order to impose the downstream pressure on said discharge pressure chamber tending to open said valve, the setting of said valve being determined by the resultant of the forces of said spring, the pressure in said ram pressure chamber, the response of said bellows in said static pressure chamber acting in opposition to the fuel pressure in the discharge pressure chamber, and means for establishing communication between said fuel pressure chamber and said spring chamber for eliminating variations in fuel pressure in said metered fuel chamber for the adjustment of said valve.

3. A fuel flow control device for ram jet engines comprising a housing having a first part divided into a fuel inlet chamber to receive fuel under pressure and a fuel outlet chamber, a fuel valve controlling the transfer of fuel between said chambers, a fuel delivery conduit connected to and leading from said fuel outlet chamber, an orifice restriction in said fuel delivery conduit, a diaphragm acting as one wall of said outlet chamber, a second housing part surrounding said diaphragm and having a second diaphragm as a wall thereof, a pressure sensing conduit connected between said fuel delivery conduit on the downstream side of said orifice restriction and said second housing part for communicating the pressure of the fuel flowing in said delivery conduit to said diaphragms, a third housing part having a chamber therein closed by a third diaphragm, said second and third housing parts being spaced apart but having the chambers therein in communication, a valve stem extending from said fuel valve into each of said second and third housing parts and being connected to all of said diaphragms, a spring in said third housing part bearing on said valve steam in a direction to open said fuel valve and supply increased fuel to the engine, said first mentioned diaphragm acting under the pressure of fuel flowing to the engine to move said fuel valve in a fuel decreasing direction, fourth and fifth housing parts and a common diaphrgam acting as a wall therebetween, said last mentioned housing parts being arranged between said second and third housing parts and having said second and third diaphragms acting as wall portions thereof, said valve stem having a connection with said common diaphragm, static pressure responsive means in one of said last mentioned housing parts acting on said common diaphragm to adjust said fuel valve with altitude of the ram jet engine, said one of said last mentioned housing parts having a port open to atmosphere, and ram air conduit means opening to said other one of said last mentioned housing parts to admit ram air pressure to act on said common diaphragm in opposition to said static pressure responsive means for adjusting said fuel valve with pressure of the ram air and hence speed of the ram jet engine.

4. The fuel flow control device for ram jet engines set forth in claim 3, wherein a second spaced flow restricting orifice is located in said fuel delivery conduit spaced from said first mentioned orifice, an orifice is located in said pressure sensing conduit, and a pressure sensing by-pass conduit connects the fuel delivery conduit between said spaced orifices and said pressure sensing conduit for separating said orifices into two stage flow control over said fuel valve.

5. The fuel flow control device for ram jet engines set forth in claim 4, wherein a control valve is located in said pressure sensing by-pass conduit to selectively control the stages of flow control over said fuel valve.

6. The fuel flow control device for ram jet engines set forth in claim 3, wherein spaced flow restricting orifices are placed in said fuel delivery conduit between said first housing part and the connection of said pressure sensing conduit, a flow restricting orifice in said pressure sensing conduit, and a valve controlled by-pass conduit connected into said fuel delivery conduit between said spaced orifices and connected into said pressure sensing conduit between the orifice therein and said second housing part.

References Cited in the file of this patent

UNITED STATES PATENTS

| Number | Name | Date |
|---|---|---|
| 2,295,728 | Gess | Sept. 15, 1942 |
| 2,408,836 | Warner | Oct. 8, 1946 |
| 2,429,101 | Leslie, 2nd | Oct. 14, 1947 |
| 2,478,288 | Lee | Aug. 9, 1949 |
| 2,550,678 | Deacon | May 1, 1951 |
| 2,583,006 | Niesemann | Jan. 22, 1952 |

FOREIGN PATENTS

| Number | Country | Date |
|---|---|---|
| 828,724 | France | Feb. 21, 1938 |